US011332638B2

(12) United States Patent
Swaans et al.

(10) Patent No.: US 11,332,638 B2
(45) Date of Patent: *May 17, 2022

(54) AQUEOUS COATING COMPOSITION WITH SOFT TOUCH UPON DRYING

(71) Applicant: COVESTRO (NETHERLANDS) B.V., Nieuwegein (NL)

(72) Inventors: Roel Johannes Marinus Swaans, Echt (NL); Ronald Tennebroek, Echt (NL); Gerardus Cornelis Overbeek, Echt (NL); Paul de Kok, Echt (NL)

(73) Assignee: COVESTRO (NETHERLANDS) B.V., Nieuwegein (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/109,128

(22) Filed: Dec. 1, 2020

(65) Prior Publication Data

US 2021/0087427 A1 Mar. 25, 2021

Related U.S. Application Data

(63) Continuation of application No. 16/542,229, filed on Aug. 15, 2019, now Pat. No. 10,883,015, which is a continuation of application No. 15/538,054, filed as application No. PCT/EP2015/081040 on Dec. 22, 2015, now Pat. No. 10,428,237.

(30) Foreign Application Priority Data

Dec. 23, 2014 (EP) .................................. 14200188

(51) Int. Cl.
| | |
|---|---|
| B05D 3/02 | (2006.01) |
| B05D 3/00 | (2006.01) |
| B05D 1/40 | (2006.01) |
| C08F 2/00 | (2006.01) |
| C08G 61/04 | (2006.01) |
| C09D 175/08 | (2006.01) |
| C08G 18/48 | (2006.01) |
| C08J 3/03 | (2006.01) |
| C08G 18/75 | (2006.01) |
| C08G 18/79 | (2006.01) |
| C08G 18/08 | (2006.01) |
| C08G 18/10 | (2006.01) |
| C08G 18/22 | (2006.01) |
| C08L 75/08 | (2006.01) |
| C08G 18/32 | (2006.01) |

(52) U.S. Cl.
CPC ....... *C09D 175/08* (2013.01); *C08G 18/0823* (2013.01); *C08G 18/0866* (2013.01); *C08G 18/10* (2013.01); *C08G 18/222* (2013.01); *C08G 18/325* (2013.01); *C08G 18/3231* (2013.01); *C08G 18/4825* (2013.01); *C08G 18/4854* (2013.01); *C08G 18/755* (2013.01);

*C08G 18/791* (2013.01); *C08J 3/03* (2013.01); *C08L 75/08* (2013.01); *C08L 2205/04* (2013.01)

(58) Field of Classification Search
CPC .............. C08G 18/4825; C08G 18/791; C08G 18/0866; C08G 18/4854; C08G 18/3231; C08G 18/0823; C08G 18/325; C08G 18/222; C08G 18/10; C08G 18/755; C09D 175/08; C08J 3/03; C08L 75/08; C08L 33/12; C08L 25/06; C08L 25/2205; C08L 25/04
USPC .............. 427/385.5, 384, 372.2, 331; 526/1; 520/1
See application file for complete search history.

(56) References Cited

U.S. PATENT DOCUMENTS

| 3,705,164 A | 12/1972 | Honig et al. |
| 4,198,330 A | 4/1980 | Kaizerman et al. |
| 4,644,030 A | 2/1987 | Loewrigkeit |
| 5,594,065 A * | 1/1997 | Tien ........................ C08G 18/10 524/507 |
| 7,683,139 B2 * | 3/2010 | Casteren Van ..... C08G 18/0852 525/453 |

(Continued)

FOREIGN PATENT DOCUMENTS

| CN | 101696262 | 4/2010 |
| CN | 102516465 | 6/2012 |

(Continued)

OTHER PUBLICATIONS

International Search Report and Written Opinion of the ISA for PCT/EP2015/081040, dated Mar. 9, 2016, 9 pages.

(Continued)

*Primary Examiner* — Jessica Whiteley
(74) *Attorney, Agent, or Firm* — Nixon & Vanderhye P.C.

(57) ABSTRACT

Aqueous coating compositions include dispersed polyurethane-vinyl polymer hybrid particles obtained by free-radical polymerization of at least one vinyl monomer in the presence of a polyurethane. The polyurethane and the vinyl polymer in the hybrid particles are present in a weight ratio of polyurethane to vinyl polymer ranging from 1:1 to 20:1, and the polyurethane is the reaction product of at least the following components: (a) from 5 to 40 wt. % of at least one organic difunctional isocyanate, (b) from 0.5 to 4 wt. % of an isocyanate-reactive compound containing ionic or potentially ionic water-dispersing groups having a molecular weight of from 100 to 500 g/mol, (c) from 40 to 80 wt. % of at least one diol having a molecular weight from 500 to 5000, (d) from 0 to 10 wt. % of at least one active-hydrogen chain extending compound with a functionality of at least 2 other than water, (e) from 0 to 10 wt. % of at least one diol having a molecular weight below 500 g/mol. The isocyanate and hydroxy groups on the components used are present in a respective mole ratio (NCO to OH) in the range of from 0.8:1 to 5:1.

11 Claims, No Drawings

(56) References Cited

U.S. PATENT DOCUMENTS

| | | | |
|---|---|---|---|
| 7,951,457 B2 * | 5/2011 | Casteren Van | C08G 18/7607 |
| | | | 428/425.1 |
| 9,074,038 B2 * | 7/2015 | Satgurunathan | C08G 18/12 |
| 10,428,237 B2 | 10/2019 | Swaans | |
| 2006/0258801 A1 * | 11/2006 | Martin | C08G 18/12 |
| | | | 524/591 |
| 2007/0141264 A1 * | 6/2007 | Satgurunathan | C08G 18/6659 |
| | | | 427/384 |
| 2007/0260022 A1 * | 11/2007 | Casteren Van | C08G 18/0852 |
| | | | 525/453 |
| 2008/0038563 A1 * | 2/2008 | Casteren Van | C08G 18/0823 |
| | | | 428/426 |
| 2008/0274361 A1 * | 11/2008 | Casteren Van | C08G 18/12 |
| | | | 428/425.1 |
| 2011/0020556 A1 * | 1/2011 | Satgurunathan | C08G 18/0823 |
| | | | 427/388.4 |
| 2011/0245399 A1 | 10/2011 | Pajerski et al. | |
| 2013/0129927 A1 * | 5/2013 | Satgurunathan | C08G 18/0823 |
| | | | 427/388.4 |
| 2017/0362461 A1 * | 12/2017 | Swaans | C08G 18/0823 |
| 2019/0367772 A1 * | 12/2019 | Swaans | C08G 18/4854 |

FOREIGN PATENT DOCUMENTS

| | | |
|---|---|---|
| EP | 1 489 120 | 12/2004 |
| WO | 93/24551 | 12/1993 |
| WO | 2004/060949 | 7/2004 |
| WO | 2005/058995 | 6/2005 |
| WO | 2006/002865 | 1/2006 |
| WO | 2008/101661 | 8/2008 |
| WO | 2009/074541 | 6/2009 |
| WO | 2010/015494 | 2/2010 |
| WO | 2013/153093 | 10/2013 |

OTHER PUBLICATIONS

Croda npl, May 2017 (Year: 2017).
Majid, Rohah A. et al, Nanostructures Urethane-Acrylic Hybrid Dispersions, Polymer Synthesis and Technology, pp. 216-217 (2011).

* cited by examiner

AQUEOUS COATING COMPOSITION WITH SOFT TOUCH UPON DRYING

This application is a continuation of commonly owned U.S. application Ser. No. 16/542,229 filed Aug. 15, 2019 (now U.S. Pat. No. 10,883,015) which is a continuation of Ser. No. 15/538,054 filed Jun. 20, 2017 (now U.S. Pat. No. 10,428,237), which is the U.S. national phase of International Application No. PCT/EP2015/081040 filed Dec. 22, 2015, which designated the U.S. and claims priority to EP Patent Application No. 14200188.2, filed Dec. 23, 2014, the entire contents of each of which are hereby incorporated by reference.

The present invention relates to an aqueous coating composition comprising a urethane-acrylic hybrid, a process for preparing such a composition and a coating obtained from such a composition where the coating provides a soft touch sensation with good transparency for surfaces coated with this composition and/or where the coating has good mechanical properties, like for example block resistance and/or good barrier properties like for example water and/or coffee resistance.

Coating compositions have long been used to produce coatings having desired coating characteristics. Traditionally, coatings have a visual function. For example, they protect the printed product and finish the printing image. Haptic coatings provide additional properties. Haptic properties also approach the other senses of a person and enable a multi-sensoric marketing. Feeling and touching is a subconscious process that is regarded very important in the perception of materials. Coating a surface with a soft-feel finish is intended to provide a soft, warm touch sensation and also to give a sense of premium quality to the object. Surfaces can be created that provide a soft or velvet feel or that remind of suede. Luxurious and sophisticated are words often used to describe the effect a haptic coating can produce.

Very often, the visual aspects of the substrates are important and therefore the transparency of the coating is crucial. With a matt, but transparent coating, the colours in printed materials can be enhanced significantly. For example, darker color palettes will appear more muted, sophisticated, when a matt soft touch coating is applied. Also wooden substrates maintain a natural impression by the use of these coatings.

A running behaviour as even as possible, a good scuff resistance and a very good block resistance are regarded as important properties in the application areas of these coatings. In case the coating has a poor block resistance, there may be an undesirable adhesion between two coated surfaces.

WO2010015494 describes a one-component coating composition based on an anionic polyurethane aqueous dispersion with a medium particle size above 600 nm and a specified (low) acid content. Soft-touch properties are claimed, however it has been found that mechanical properties like block resistance and barrier properties like coffee resistance are poor.

The mechanical and barrier properties can be enhanced by use of two-component coating compositions as soft-touch coatings comprising polyisocyanate crosslinkers and aqueous binders as described in EP1647399, US2008021153, WO2012052406, US2010092766. However, the disadvantages of such systems are the short pot life, handling of toxic polyisocyanate crosslinkers and the side reaction of isocyanate with water causing carbon dioxide bubbles trapped in the final coating. Furthermore, these two component systems may still demonstrate poor transparency.

One-component coating composition in the context of the present invention are understood as coating compositions which do not need to be subjected to crosslinking upon drying to obtain a coating. Thus the aqueous coating composition that is applied to a substrate does not need to contain a crosslinking component to obtain a coating, and thus the pot-life of one-component coating composition is longer than of coating composition to which a crosslinking component needs to be added in order to obtain a coating.

The object of the present invention is to provide aqueous coating compositions which can be applied as one-component coating compositions and which may result in soft-touch coating combined with good transparency, good block resistance and/or good barrier properties like water resistance, ethanol resistance, detergent resistance and/or coffee resistance.

The inventors have surprisingly found that the use of urethane-acrylic hybrids may result in improved mechanical properties like block resistances and/or improved barrier properties like water resistance, ethanol resistance, detergent resistance and/or coffee resistance and also combine good transparency in soft-touch coatings.

Accordingly, the object of the present invention has been achieved by providing an aqueous coating composition having a soft-touch upon drying comprising dispersed polymer particles, wherein
(i) the dispersed polymer particles are polyurethane-vinyl polymer hybrid particles obtained by free-radical polymerization of at least one vinyl monomer in the presence of a polyurethane,
(ii) the polyurethane and the vinyl polymer in the hybrid particles are present in a weight ratio of polyurethane to vinyl polymer ranging from 1:1 to 20:1,
(iii) the polyurethane is the reaction product of at least the following components:
 (a) from 5 to 40 wt. % of at least one organic difunctional isocyanate,
 (b) from 0.5 to 4 wt. % of an isocyanate-reactive compound containing ionic or potentially ionic water-dispersing groups having a molecular weight of from 100 to 500 g/mol,
 (c) from 40 to 80 wt. % of at least one diol having a molecular weight from 500 to 5000 and preferably a glass transition temperature from −110° C. to +110° C.,
 (d) from 0 to 10 wt. % of at least one active-hydrogen chain extending compound with a functionality of at least 2 (other than water),
 (e) from 0 to 10 wt. % of at least one diol having a molecular weight below 500 g/mol,
where the amounts of (a), (b), (c), (d) and (e) are given relative to the total amount of components used to prepare the polyurethane from which the building blocks of the polyurethane are emanated, and
where the isocyanate and hydroxy groups on the components used to prepare the polyurethane are present in a respective mole ratio (NCO to OH) in the range of from 0.8:1 to 5:1, preferably from 1.05:1 to 5:1 and even more preferably from 1.1:1 to 3.5:1.

Preferably, the aqueous coating composition having a soft-touch upon drying comprises 90-99.9 wt. % dispersed polymer particles and 0.1-10 wt. % of surfactant (whereby the amounts are given relative to the total amount of dispersed polymer particles and surfactant).

More preferably, the aqueous coating composition comprises
(A) 75-99.7 wt. % of dispersed polymer particles,
(B) 0.2 to 15 wt. % of rheology additive,
(C) 0.1 to 10 wt. % of surfactant,
whereby the amounts of (A), (B) and (C) are given relative to the total amount of dispersed polymer particles, rheology additive and surfactant.

The aqueous coating composition according to the present invention comprises dispersed polyurethane-vinyl polymer hybrid particles obtained by free-radical polymerization of at least one vinyl monomer in the presence of a polyurethane, preferably an aqueous chain-extended polyurethane.

The polyurethane and the vinyl polymer in the hybrid particles are present in a weight ratio of polyurethane to vinyl polymer ranging from 1:1 to 20:1, preferably from 2:1 to 16:1, even more preferably from 3:1 to 12:1, even more preferably from 4:1 to 12:1 and even more preferably from 4:1 to 10:1.

Methods for preparing polyurethanes are known in the art and are described in for example the Polyurethane Handbook $2^{nd}$ Edition, a Carl Hanser publication, 1994, by G. Oertel. The polyurethane (A) may be prepared in a conventional manner by reacting at least one organic polyisocyanate with at least one isocyanate-reactive component by methods well known in the prior art. Isocyanate-reactive groups include —OH, —SH, —NH—, and —$NH_2$. Usually an isocyanate-terminated polyurethane prepolymer is first formed which is then chain extended with an active hydrogen containing compound although a polyurethane may also be prepared without a chain extension step.

The polyurethane present in the aqueous coating composition of the present invention is obtained by reacting at least components (a), (b), (c) and optionally (d) and optionally (e).

Component (a)

Component (a) is at least one organic difunctional isocyanate. The amount of component (a) relative to the total amount of components used to prepare the polyurethane is from 5 to 40 wt. % and preferably from 10 to 35 wt. %.

Examples of suitable organic difunctional isocyanates (component (a)) include ethylene diisocyanate, 1,6-hexamethylene diisocyanate (HDI), isophorone diisocyanate (IPDI), cyclohexane-1,4-diisocyanate, 4,4'-dicyclohexylmethane diisocyanate (4,4'-$H_{12}$ MDI), p-xylylene diisocyanate, p-tetramethylxylene diisocyanate (p-TMXDI) (and its meta isomer m-TMXDI), 1,4-phenylene diisocyanate, hydrogenated 2,4-toluene diisocyanate, hydrogenated 2,6-toluene diisocyanate, 4,4'-diphenylmethane diisocyanate (4,4'-MDI), polymethylene polyphenyl polyisocyanates, 2,4'-diphenylmethane diisocyanate, 3(4)-isocyanatomethyl-1-methyl cyclohexyl isocyanate (IMCI) and 1,5-naphthylene diisocyanate. Preferred organic difunctional isocyanates are IPDI and/or $H_{12}$MDI which provide improved low yellowing. Mixtures of organic difunctional isocyanates can be used. Conveniently component (a) comprises IPDI in an amount of at least 30 parts by weight, more conveniently ≥50 parts by weight, most conveniently ≥70 parts by weight, relative to the total weight of component (a).

Component (b)

Component (b) is at least one isocyanate-reactive compound containing ionic or potentially ionic water-dispersing groups and having a (number average) molecular weight of from 100 to 500 g/mol. The amount of component (b) relative to the total amount of components used to prepare the polyurethane is from 0.5 to 4 wt. %, preferably from 0.8 to 3.2 wt. % and even more preferably from 1 to 2.5 wt %. As used herein, potentially anionic dispersing group means a group which under the relevant conditions can be converted into an anionic group by salt formation (i.e. deprotonating the group by a base).

Component (b) comprises any suitable polyol, preferably diol, containing ionic or potentially ionic water-dispersing groups. Preferred ionic water-dispersing groups are anionic water-dispersing groups. Preferred anionic water-dispersing groups are carboxylic, phosphoric and/or sulphonic acid groups. Examples of such compounds include carboxyl containing diols, for example dihydroxy alkanoic acids such as 2,2-dimethylol propionic acid (DMPA) or 2,2-dimethylolbutanoic acid (DMBA). Alternatively sulfonate groups may be used as potentially anionic water-dispersing groups. The anionic water-dispersing groups are preferably fully or partially in the form of a salt. Conversion to the salt form is optionally effected by neutralisation of the polyurethane prepolymer with a base, preferably during the preparation of the polyurethane prepolymer and/or during the preparation of the aqueous composition of the present invention. If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4(OH)$, can also be used. Generally a base is used which gives counter ions that may be desired for the composition. For example, preferred counter ions include $Li^+$, $Na^+$, $K^+$, $NH_4^+$ and substituted ammonium salts. Cationic water dispersible groups can also be used, but are less preferred. Examples include pyridine groups, imidazole groups and/or quaternary ammonium groups which may be neutralised or permanently ionised (for example with dimethylsulphate). A very suitable component (b) is dimethylol propionic acid (DMPA).

The neutralising agent is preferably used in such an amount that the molar ratio of the ionic and potentially ionic water dispersing groups to the neutralizing groups of the neutralising agent are in the range of from 0.7 to 5.0, more preferably from 0.8 to 3.0 and even more preferably from 0.85 to 1.2.

Component (c)

Component (c) is at least one diol having a (number average) molecular weight from 500 to 5000 g/mol. As used herein, the number average molecular weight of a polyol is determined by multiplying the equivalent weight of the polyol with the OH functionality of the polyol (the OH functionality of the polyol is given by the supplier; in case the polyol is a diol, the OH functionality is 2). The equivalent weight of the polyol is calculated by dividing 56100 by the OH number of the polyol. The OH number of the polyol is measured by titration a known mass of polyol according to ASTM D4274 and is expressed as mg KOH/g.

The amount of diol having a number average molecular weight from 500 to 5000 g/mol (component (c)) relative to the total amount of components used to prepare the polyurethane is from 40 to 80 wt. %, preferably from 45 to 75 wt. % and even more preferably from 50 to 70 wt. %. Such polyol may be selected from any of the chemical classes of polyols that can be used in polyurethane synthesis. In particular the polyol may be a polyester polyol, a polyesteramide polyol, a polyether polyol, a polythioether polyol, a polycarbonate polyol, a polyacetal polyol, a polyvinyl polyol and/or a polysiloxane polyol.

The glass transition temperature $T_g$ of the component (c) is preferably from −110° C. to +110° C., more preferably from −100° C. to +40° C. and most preferably from −100° C. and −35° C. As used herein, the glass transition temperature is determined using differential scanning calorimetry DSC according to the method as described in the international standard ISO 11357-2 (Plastics—Differential scanning calorimetry (DSC)—Part 2: Determination of glass transition temperature) taking the midpoint temperature as $T_g$ using a DSC Q1000 or Q2000 from TA Instruments.

Preferred diols (c) are polyether diols that preferably comprise polyalkyleneglycol (such as polypropyleneglycol (PPG); polyethyleneglycol (PEG); polytetrahydrofuran (also known as polyTHF, pTHF, polytetramethylene ether glycol (PTMEG)). Usefully Polyether Polyol B is selected from the group consisting of PPG, PEG, pTHF and mixtures thereof, more usefully PPG and/or pTHF, most usefully pTHF and for example those grades of pTHF available commercially (e.g. from BASF) under the trade designations pTHF650, pTHF1000 and/or pTHF2000

Component (d)

Component (d) is at least one active-hydrogen chain extending compound with a functionality of at least 2 (other than water). The amount of component (d) relative to the total amount of components used to prepare the polyurethane is from 0 to 10 wt. %. The amount of component (d) relative to the total amount of components used to prepare the polyurethane is preferably from 0.5 to 10 wt. %, more preferably from 1 to 7 wt. % and the isocyanate and hydroxy groups on the polyurethane precursors are then preferably present in a respective mole ratio (NCO to OH) in the range of from 1.05:1 to 5:1.

The aqueous composition may be prepared by dispersing an isocyanate-terminated polyurethane prepolymer in an aqueous medium and chain extending the prepolymer with at least one active hydrogen-containing chain extending compound with a functionality of at least 2 in the aqueous phase. Active hydrogen-containing chain extenders (component (d)) which may be reacted with an isocyanate-terminated polyurethane prepolymer include amino-alcohols, primary or secondary diamines or polyamines, hydrazine, and substituted hydrazines.

Examples of suitable active hydrogen-containing chain extenders with functionality 2 include alkylene diamines such as ethylene diamine and cyclic amines such as isophorone diamine. Also materials such as hydrazine, substituted hydrazines such as, for example, dimethyl hydrazine, 1,6-hexamethylene-bis-hydrazine, carbodihydrazine, hydrazides of dicarboxylic acids and sulphonic acids such as adipic acid mono- or dihydrazide, oxalic acid dihydrazide, isophthalic acid dihydrazide, hydrazides made by reacting lactones with hydrazide such as gammahydroxylbutyric hydrazide, bis-semi-carbazide, and bis-hydrazide carbonic esters of glycols may be useful. Water itself may be effective as an indirect chain extender. Water-soluble active hydrogen chain extenders are preferred. Water itself may be used as an indirect chain extender because it will slowly convert some of the terminal isocyanate groups of the prepolymer to amino groups (via unstable carbamic acid groups) and the modified prepolymer molecules will then undergo chain extension. However, this is very slow compared to chain extension using the active-hydrogen chain extenders.

Preferably the active-hydrogen chain extending compound with functionality 2 is selected from the group comprising, amino-alcohols, primary or secondary diamines, hydrazine, substituted hydrazines and substituted hydrazides.

Where the chain extender is other than water, for example, a hydrazine, it may be added to the aqueous dispersion of the isocyanate-terminated polyurethane prepolymer or, alternatively, it may already be present in the aqueous medium when the isocyanate-terminated polyurethane prepolymer is dispersed therein.

The chain extension may be conducted at convenient temperatures from about 5° C. to 95° C. or, more preferably, from about 10° C. to 60° C.

The total amount of active-hydrogen chain extending compound employed, if used, (apart from water) should be such that the ratio of active hydrogens in the chain extender to isocyanate groups in the polyurethane prepolymer preferably is in the range from 0.1:1 to 2:1, more preferably from 0.6:1 to 1.4:1 and especially preferred from 0.8 to 1.2.

Component (e)

Component (e) is at least one diol having a (number average) molecular weight below 500 g/mol, preferably in the range of 40 to 250 g/mol. The amount of component (e) relative to the total amount of components used to prepare the polyurethane is from 0 to 10 wt. % and preferably from 0.1 to 10 wt. %. Examples include ethylene glycol, neopentylglycol, butane diol, pentane diol, hexane diol and 1,4 cyclohexanedimethanol.

The dispersed polyurethane-vinyl polymer hybrid particles present in the aqueous coating composition of the present invention is obtained by free-radical polymerization of at least one vinyl monomer in the presence of a polyurethane. At least 30 wt. %, more preferably at least 50 wt. % and even more preferably at least 70 wt. % of the total amount of vinyl monomer(s) used to prepare the vinyl polymer is selected from the group consisting of methyl methacrylate, butyl acrylate, butyl methacrylate, acrylonitrile, styrene and mixtures of two or more of said monomers. Preferably, the vinyl monomer used to prepare the vinyl polymer is selected from the group consisting of methyl methacrylate, butyl acrylate, butyl methacrylate and mixtures thereof. More preferably at least 30 wt. %, preferably at least 50 wt. % and more preferably at least 70 wt. % of the total amount of vinyl monomer(s) used to prepare the vinyl polymer is methyl methacrylate.

The vinyl monomer(s) are polymerized using a conventional free radical yielding initiator system. Suitable free radical yielding initiators include mixtures partitioning between the aqueous and organic phases. Suitable free-radical-yielding initiators include inorganic peroxides such as ammonium persulphate hydrogen peroxide, organic peroxides, such as benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as iso-ascorbic acid. Azo compounds such as azobisisobutyronitrile may also be used. Metal compounds such as Fe. EDTA (EDTA is ethylene diamine tetracetic acid) may also be usefully employed as part of the redox initiator system. The amount of initiator or initiator system to use is conventional, e.g. within the range of 0.05 to 6 wt % based on the weight of vinyl monomer used.

The aqueous coating composition according to the present invention preferably comprises from 0.2 to 15 wt. % of rheology additive (relative to the total amount of dispersed polymer particles, rheology additive and surfactant), in particular associative thickener. Associative thickeners herein improve storage stability by increasing the viscosity of the composition. Examples of associative thickeners include water soluble polymers, in particular hydrophobic modified water soluble polymers such as hydrophobically modified ethylene oxide urethane block copolymers (HEUR) which provides stabilisation and modifies the rheology by acting as a thickener and hydrophobically modified alkali soluble emulsions (HASE). HEUR's tend to be mainly non-ionic and HASE's tend to be anionic in nature. Preferably a hydrophobically modified ethylene oxide urethane block copolymer is used with a sequence of at least 5 ethylene oxide groups, preferably 10, most preferably 20.

The aqueous coating composition according to the present invention preferably comprises from 0.1 to 10 wt. % of surfactant (relative to the total amount of dispersed polymer particles, rheology additive and surfactant), preferably 0.1 to 8% by weight, still more preferably 0.1 to 5% by weight, especially 0.1 to 3% by weight, and most especially 0.3 to 2.5% by weight. Surfactants and optionally high shear can be utilised in any order to assist in the dispersion of isocyanate-terminated polyurethane prepolymer in water (even if it is self-dispersible). Suitable surfactants include but are not limited to conventional anionic, cationic and/or nonionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$, alkyl sulphates, alkali metal salts of sulphonic acids; fatty alcohols, ethoxylated fatty acids and/or fatty amines, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. Preferred surfactants are non-ionic surfactants.

In the present invention, the polyurethane of the polyurethane-vinyl polymer hybrid particles is preferably cross-linked. The crosslinked polyurethane is preferably prepared by further adding at least one of the following crosslinkers (f), (g) and (d'):
  (f) at least one organic polyisocyanate with an average functionality of >2.3, more preferred >2.5;
  (g) at least one polyol having a molecular weight of 500-5000 g/mol and an average functionality of at least 2.3, more preferably at least 2.6, most preferably at least 2.9, and preferably a glass transition temperature from –110° C. and +110° C.;
  (d') at least one active-hydrogen chain extending compound with a functionality of 3 or higher in an amount of at least 50 wt. % of component (d).

Component (f)

Preferably, the total amount of (f), (g) and (d') are together more than 3 wt. %, preferably more than 5 wt. %, and even more preferably more than 10 wt. %, relative to the total amount of components used to prepare the polyurethane. Preferably, the total amount of (f), (g) and (d') are together at most 20 wt. %, relative to the total amount of components used to prepare the polyurethane.

Component (f) is at least one organic polyisocyanate with an average functionality of >2.3, more preferably >2.5. The amount of component (f) relative to the total amount of components used to prepare the polyurethane is from 1 to 20 wt. %, more preferably from 5 to 15 wt. %, even more preferably from 8 to 12 wt. % (relative to the total amount of components used to prepare the polyurethane). Usefully the organic polyisocyanate has an average NCO functionality of from 2.3 to 6.0, more usefully from 2.5 to 4.0.

Component (f) is preferably selected from the group consisting of hexamethylene diisocyanate isocyanurate such as for example Desmodur N3300 from Bayer, hexamethylene diisocyanate biuret such as for example Desmodur N3200 from Bayer, isophorone diisocyanate isocyanurate such as for example Vestanat T1890 from Evonik and any mixture thereof.

Component (g)

Component (g) is at least one polyol having a (number average) molecular weight of 500-5000 g/mol and an average functionality of at least 2.3, more preferably at least 2.6, most preferably at least 2.9.

The amount of component (g) relative to the total amount of components used to prepare the polyurethane is from 1 to 10 wt. % and more preferably from 2 to 7 wt. % of at least one polyol having a number average molecular weight of 500-5000 g/mol (relative to the total amount of components used to prepare the polyurethane). Usefully the organic polyol has an average OH functionality of from 2.3 to 4.5, more usefully from 2.5 to 3.5.

The glass transition temperature $T_g$ of the component (g) preferably is from –110° C. to +110° C., more preferably from –100° C. to +40° C. and most preferably from –100° C. and –35° C. As used herein, the glass transition temperature is determined using differential scanning calorimetry DSC according to the method as described in the international standard ISO 11357-2 (Plastics—Differential scanning calorimetry (DSC)—Part 2: Determination of glass transition temperature) taking the midpoint temperature as $T_g$ using a DSC Q1000 or Q2000 from TA Instruments.

In one embodiment of the present invention it is strongly preferred that component (g) comprises at least 80% (more preferably at least 90%, even more preferably at least 95%, most preferably at least 98%, for example 100%) by weight of organic triol. The polyol may be a polyester polyol, a polyesteramide polyol, a polyether polyol, a polythioether polyol, a polycarbonate polyol, a polyacetal polyol, a polyvinyl polyol and/or a polysiloxane polyol. Component (g) is preferably selected from the group consisting of polyether polyols and/or polysiloxane polyol.

Component (d')

Component (d') is at least one active-hydrogen chain extending compound with a functionality of 3 or higher. The amount of component (d') is at least 50 wt. % of component (d). Thus, the amount of (d') is included in the amount of (d).

In one embodiment of the present invention it is strongly preferred that component (d') comprises at least 80% (more preferably at least 90%, even more preferably at least 95%, most preferably at least 98%, for example 100%) by weight of organic triamine. Component (d') is preferably selected from the group consisting of diethylene triamine, triethylene tetraamine, 4-amino-1,8-octanediamine of and any mixture thereof.

Preferably, the components from which the building blocks of the polyurethane, present in the aqueous coating composition according to the present invention, are emanated are components (a), (b), (c) and optionally (d), (e), (f) and/or (g).

In a first stage of the preparation of the polyurethane present in the aqueous coating composition of the present invention, a polyurethane prepolymer is obtained by reacting (a), (b), (c) and optionally (e) and/or (g) (where present) and the polyurethane prepolymer is obtained prior to reacting components (d) and/or (f) (where present). Some or all of the vinyl monomers may be present at the commencement of the preparation of the isocyanate-terminated prepolymer, or some or all of the vinyl monomers may be added during the course of the preparation, or some or all of the vinyl monomers may be added after having prepared the isocyanate-terminated prepolymer or some or all of the vinyl monomers may be added to the aqueous phase in which the urethane prepolymer is dispersed or some or all of the vinyl monomers may be added to the aqueous dispersion of the chain extended polyurethane (so after reaction with component (d)) in which case the vinyl monomer(s) swell into the chain extended polyurethane particles). Preferably the vinyl monomers are not polymerised until after any optional chain extension has been carried out.

In case crosslinker (d') and/or (f) is used, the crosslinker is added after having finished the preparation of the isocyanate terminated polyurethane prepolymer obtained by reacting (a), (b), (c) and optionally (e). When crosslinker (g) is used however, the compound is typically incorporated in the polyurethane prepolymer, together with (a), (b), (c) and optionally (e). The crosslinking reaction is preferably effected during the chain-extension of the polyurethane prepolymer, which chain extension is preferably effected in the polyurethane prepolymer aqueous dispersion. In case a component (f) is used as crosslinker, such crosslinker may be added to the isocyanate terminated prepolymer prior to dispersing of to the isocyanate terminated prepolymer. In case a component (d') is used as crosslinker, such crosslinker is added after having dispersed the isocyanate terminated polyurethane prepolymer and/or is added to the water in which the isocyanate terminated polyurethane prepolymer is dispersed. In case component (g) is used as crosslinker, component (g) will preferably be incorporated in the polyurethane prepolymer resulting in some branching of the polyurethane prepolymer, but the crosslinking into a network will be effected during the chain extension step.

In a special embodiment the coating composition further comprises a slip additive. Examples are but not limited to polysiloxanes and fluorocomponents to adjust the desired feel.

Preferably, the aqueous coating composition of the present invention is a one-component composition.

The aqueous coating composition and/or coatings of the invention contain organic solvent in an amount of preferably at most 20000 ppm, more preferably at most 10000 ppm, more preferably at most 5000 ppm, more preferably at most 3000 ppm, even more preferably at most 1000 ppm, even more preferably at most 500 ppm. The aqueous coating composition and/or coatings of the invention are more preferably free of organic solvent.

The mean particle size (D[0.5]) of the dispersed polymer particles (A) is preferably greater than 0.5 micron, more preferably greater than 0.8 micron, most preferably greater than 1.2 micron and especially preferred greater than 1.5 micron. D[0.5] means that the first 50 volume % of the particle size distribution has a mean particle size X.

The mean particle size (D[0.9]) of the dispersed polymer particles (A) is preferably less than 20 micron, more preferably less than 15 micron, more preferably less than 10 micron and especially preferred less than 6 micron. D[0.9] means that the first 90 volume % of the particle size distribution has a mean particle size Y. In the context of the present invention, the particle size and particle size distribution are measured by laser diffraction using a Mastersizer 3000 from Malvern.

Gloss measurements are made with 60° or 85° geometry of angles and apertures. Preferably the 60° gloss of the aqueous coating composition after drying is ≤10. Preferably the 85° gloss of the aqueous coating composition after drying is ≤60.

Preferably, the delta L value of the aqueous coating composition after drying on a black substrate is ≤30, more preferably ≤25 and even more preferably 20.

The present invention further relates to a process for preparing an aqueous coating composition according to any one of the preceding claims comprising the following steps:
a) reaction of components (a) to (c) to form a polyurethane;
b) optionally neutralising the polyurethane;
c) forming an aqueous dispersion of the polyurethane in water;
d) optionally adding active-hydrogen chain extending compound (d)
e) optionally adding at least one crosslinker (f), (g) and/or (d');
f) adding at least a surfactant;
g) adding at least rheology additive;
h) adding vinyl monomer;
i) adding a radical initiator.
where steps b), c), e), f), g), h) and i) may be in any order.

There is further provided according to the present invention a coating obtained by (i) applying an aqueous coating composition according to any one of claims 1 to 24 to a substrate and (ii) drying the aqueous coating composition by evaporation of volatiles to obtain a coating, wherein the coating has a soft touch and whereby no additional chemical crosslinking reaction is needed after having applied the coating composition on the substrate like for example UV curing and/or curing with the aid of a crosslinker. The aqueous coating composition according to the present invention allows to obtain a coating solely by drying the aqueous coating composition by evaporation of volatiles; a crosslinker and/or external curing trigger such as UV-radiation is not needed.

The coating composition of this invention can be used either to protect a substrate underneath, or to improve the aesthetics and haptic perception of a subject, or to provide additional properties to the subject or a combination of these. This coating composition can be applied to various substrates, such as wood, metal, paper, plastic, plastic films. The coating can be applied in various ways, such as spraying, brushing, roll-to-roll, curtain coating, printing (flexo, gravure). The coating compositions according to the invention can advantageously be used in packaging (such as laminating plastic films, paper and board), in printing applications such as overprint varnishes, for wood furniture, for parquet flooring, for flexible flooring (such as PVC, linoleum), for decorative paints. Preferably, the substrate is a paper substrate, a plastic substrate or a wooden substrate (or a combination thereof).

The present invention further relates to the use of the aqueous coating composition according to the present invention to obtain a coating having a soft touch.

The present invention is now illustrated by reference to the following example. Unless otherwise specified, all parts, percentages and ratios are on a weight basis.
Materials & abbreviations used:
PPG2000=polypropyleneglycol with a number average molecular weight of 2000 g/mol=component (c)
pTHF1000=polytetrahydrofuran with a number average molecular weight of 1000 g/mol=component (c)
DMPA=dimethylol propionic acid=component (b)
IPDI=isophorone diisocyanate=component (a)
MMA=methylmethacrylate=vinyl monomer
Styrene=vinyl monomer
TEA=triethylamine=neutralizer
DETA=diethylene triamine=component (d')
Desmodur N3300 from Bayer=Hexamethylene diisocyanate isocyanurate=component (f)

Vestamin A95 from Evonik=a 50% solution of 2-[(2-aminoethyl)amino]ethanesulfonic acid, sodium salt in water=component (d)
SA=stoechiometric amounts
Tegofoamex 805=Defoamer ex Tego
Nopco DSX 1514=Associative thickener ex BASF
Disponil AFX3070=Surfactant ex BASF

EXAMPLES AND COMPARATIVE EXPERIMENTS

The following examples and comparative experiments were prepared and coatings were obtained and tested. The compositions of the examples is shown in Table 4 and results are as shown in Tables 1-3.
Staining Resistances The aqueous coating composition is applied to a test chart from Leneta at a wet layer thickness of 50 micron and dried at room temperature for one hour and subsequently for 16 hours at 50° C.

Cotton wool, soaked with various testing liquids (water, 50% ethanol in water, coffee and "Cif" a commonly used Dutch detergent) were placed on the coatings and covered to prevent fast evaporation. The cotton wool was removed after 16 hours at room temperature. The water and detergent resistances were assessed directly and the ethanol resistance was assessed after one hour. Poor=severely impaired, moderate=impaired, good=minor impairment, very good=hardly impaired, excellent=no impairment
Anti-Blocking The aqueous coating composition is applied to a test chart from Leneta at a wet layer thickness of 50 micron and dried at room temperature for one hour and subsequently for 16 hours at 50° C. The coated surface is cut into pieces of 50×150 mm and folded so that both lacquer against lacquer and lacquer against backside is tested. The folded substrate is put a so-called block tester and the pressure is set at 1 kg/m2 or 6 kg/m2. The block tester is put in an oven at 52° C. for 16 hours. After this treatment, the test specimen is taken out of the block tester and conditioned at room temperature for one hour. The blocking is determined by pulling the two test specimen apart by hand. The degree of blocking is determined on the basis of the easiness of pulling the two test specimens apart. It is also very important that the coating is not impaired or damaged. Poor=severely impaired, moderate=impaired, good=minor impairment, very good=hardly impaired, excellent=no impairment.
Gloss Measurements BYK Gardner micro-TRI-gloss 20-60-85 glossmeter in accordance with ASTM D523-89.
Particle Size Measurements A Mastersizer 3000 from Malvern, which measures the particle size and particle size distribution by laser diffraction, was used to measure the particle size the dispersed polymer particles (A).

The technique of laser diffraction is based on the principle that particles passing through a laser beam will scatter light at an angle that is directly related to their size. The observed scattering intensity is also dependent on particle sizes. Large particles scatter light at narrow angles with high intensity, whereas small particles scatter light at wider angles but with low intensity.

Comparative Example A

Comparative example A is a polyurethane dispersion that is precrosslinked by the use of a triisocyanate. However, it is no urethane/vinyl hybrid dispersion.

A 2000 cm3 flask equipped with a thermometer and overhead stirrer was charged with 873.8 g of PPG2000 (OH-value=55 mg KOH/g), 22.2 g DMPA and 264.0 g IPDI. This mixture was heated to 50° C. and Zinc neodecanoate (0.49 g) was added. The reaction was allowed to exotherm to 95° C. After the exotherm was complete the reaction was kept at 95° C. for 2 hours. Subsequently, the prepolymer is cooled to 75° C. and 139.5 g of Desmodur N3300 is added. The isocyanate content of the prepolymer was 5.89% (theoretical 6.17%). 20.1 g of triethylamine was added to the prepolymer to neutralise the acid groups and the mixture was homogenised with stirring.

A 3000 cm3 dispersion vessel with a thermometer and overhead stirrer was charged with 1677.3 g of demineralised water, 9.2 g of Tegofoamex 805 (obtained from Tego), 62.8 of DSX 1514 (obtained from BASF) and 19.8 g Disponil AFX3070 (obtained from BASF). The mixture was homogenised with stirring and the temperature was adjusted to 20-22° C.

817.6 g of the neutralised prepolymer was dispersed in the aqueous phase adjusting the stir rate to improve dispersing of the prepolymer if necessary, while maintaining the temperature of the aqueous phase below 27° C. After the give amount of prepolymer was dispersed, stirring was continued for 5 minutes after which 98.12 g of a 16.4% hydrazine solution was added to provide the chain extended polyurethane dispersion.

The resulting polyurethane dispersion had a solids content of 31.8 wt %, a pH of 7.3 and a viscosity of 966 cps. The dispersion has a D(0.5) mean particle size of 2.0 micron and a D(0.9) mean particle size of 4.3 micron

Comparative Example B

Comparative Example B is a polyurethane dispersion, which is used as an example in patent WO 2010/015494. Soft feel properties are good, but resistance profile is very poor.

A 2000 cm3 flask equipped with a thermometer and overhead stirrer was charged with 790.2 g of pTHF1000 (OH-value=112 mg KOH/g), 30.0 g DMPA and 0.44 g phosphoric acid 85%. A nitrogen atmosphere was applied. The mixture was homogenised at 40° C. for 10 minutes, before 429.3 g IPDI was added. This mixture was heated to 60° C. and kept at this temperature for 60 minutes. Subsequently reaction was carried out at 80° C. until the NCO-content of the mixture was 5.96%, the prepolymer was cooled down to 75° C. and 22.7 g of triethylamine was added to the prepolymer.

A 2000 cm3 dispersion vessel with a thermometer and overhead stirrer was charged with 777.4 g of demineralised water and 375.6 g of the neutralised prepolymer was dispersed in the aqueous phase while maintaining the temperature of the aqueous phase below 35° C. After the give amount of prepolymer was dispersed, stirring was continued for 5 minutes after which a mixture of 43.2 g of a 15.7% hydrazine solution and 37.3 g of Vestamin A95 was added to provide the chain extended polyurethane dispersion.

The resulting polyurethane dispersion had a solids content of 32.6 wt %, a pH of 9.2 and a viscosity of 10 cps. The dispersion has a D(0.5) mean particle size of 2.6 micron and a D(0.9) mean particle size of 7.6 micron.

Comparative Example C

Comparative example C is a urethane/vinyl dispersion with a DMPA-content above the limits specified in claim 1.

This results in the formation of small particles. The final coating has a high gloss and no soft feel properties.

A 2000 cm3 flask equipped with a thermometer and overhead stirrer was charged with 742.6 g of pTHF1000 (OH-value=112 mg KOH/g), 60.0 g DMPA, 300.0 g MMA, 0.3 g of 2,6-di-tert-butyl-p-cresol and 397.4 g IPDI. This mixture was heated to 70° C. and the reaction was allowed to exotherm to 95° C. After the exotherm was complete the reaction was kept at 95° C. for 2 hours. Subsequently, the prepolymer is cooled to 75° C. and the isocyanate content of the prepolymer was determined: 3.26% (theoretical 3.34%). 40.7 g of triethylamine (0.9 SA) was added to the prepolymer to neutralise the acid groups and the mixture was homogenised with stirring.

A 2000 cm3 dispersion vessel with a thermometer and overhead stirrer was charged with 1075.0 g of demineralised water. 616.3 g of the neutralised prepolymer was dispersed in the aqueous phase adjusting the stir rate to improve dispersing of the prepolymer if necessary, while maintaining the temperature of the aqueous phase below 27° C. After the give amount of prepolymer was dispersed, stirring was continued for 5 minutes after which 43.2 g of a 16.4% hydrazine solution was added to provide the chain extended polyurethane dispersion.

The radical polymerization was initiated by the addition of 0.30 g of tertiary butyl hydroperoxide, 0.006 g of iron (II)EDTA and a subsequent addition of 36.4 g of a 1.0% solution of isoascorbic acid in demineralized water.

The resulting urethane/acrylic hybrid dispersion with a urethane/acrylic ratio of 80/20 had a solids content of 33.3 wt %, a pH of 8.0 and a viscosity of 181 cps. The dispersion has a D(0.9) mean particle size of 45 nm (0.045 micron).

Example 1

Example 1 is the 80/20 urethane/vinyl modification of Comparative Example A. The hybrid is formed by swelling the polyurethane particles with methylmethacrylate and subsequent polymerisation.

A 1000 cm3 flask equipped with a thermometer and overhead stirrer was charged with 301.5 g of dispersion A. 33.9 g of demineralized water was added and the temperature was increased to 30° C. 24.1 g of MMA was dosed to the reactor and the mixture was stirred gently for 60 minutes.

The radical polymerization was initiated by the addition of 0.19 g of tertiary butyl hydroperoxide, 0.009 g of iron (II)EDTA and a subsequent addition of 13.3 g of a 1.36% solution of isoascorbic acid in demineralized water.

The resulting urethane/acrylic hybrid dispersion with a urethane/acrylic ratio of 80/20 had a solids content of 31.3 wt %, a pH of 8.4 and a viscosity of 4690 cps. The dispersion has a D(0.5) mean particle size of 2.0 and a D(0.9) mean particle size of 4.3 micron Example 2

Example 2 is the 90/10 urethane/vinyl hybrid modification of Comparative Example A. The hybrid is formed by dispersion of the polyurethane prepolymer into an aqueous phase that contains styrene. After chain extension of the polyurethane, the vinyl monomers are polymerised inside the urethane particles.

A 1000 cm3 flask equipped with a thermometer and overhead stirrer was charged with 268.9 g of PPG2000 (OH-value=55 mg KOH/g), 6.82 g DMPA and 81.2 g IPDI. This mixture was heated to 50° C. and Zinc neodecanoate (0.15 g) was added. The reaction was allowed to exotherm to 95° C. After the exotherm was complete the reaction was kept at 95° C. for 2 hours. Subsequently, the prepolymer is cooled to 75° C. and 42.9 g of Desmodur N3300 is added. The isocyanate content of the prepolymer was 5.68% (theoretical 6.17%). 6.18 g of triethylamine was added to the prepolymer to neutralise the acid groups and the mixture was homogenised with stirring.

A 2000 cm3 dispersion vessel with a thermometer and overhead stirrer was charged with 680.7 g of demineralised water, 3.4 g of Tegofoamex 805 (obtained from Tego), 23.2 g DSX 1514 (obtained from BASF), 7.3 g Disponil AFX3070 (obtained from BASF) and 33.0 g of styrene. The mixture was homogenised with stirring and the temperature was adjusted to 20-22° C.

301.6 g of the neutralised prepolymer was dispersed in the aqueous phase adjusting the stir rate to improve dispersing of the prepolymer if necessary, while maintaining the temperature of the aqueous phase below 27° C. After the give amount of prepolymer was dispersed, stirring was continued for 5 minutes after which 36.2 g of a 16.4% hydrazine solution was slowly added to provide the chain extended polyurethane dispersion.

After 15 minutes of mixing, the radical polymerization was initiated by the addition of 0.12 g of tertiary butyl hydroperoxide, 0.006 g of iron(II)EDTA and a subsequent addition of 8.20 g of a 1.34% solution of isoascorbic acid in demineralized water.

The resulting urethane/acrylic hybrid dispersion with a urethane/acrylic ratio of 90/10 had a solids content of 29.2 wt %, a pH of 7.3 and a viscosity of 1360 cps. The dispersion has a D(0.5) mean particle size of 2.4 micron and a D(0.9) mean particle size of 5.1 micron.

TABLE 1

| Example | Gloss 60° | Soft feel | Anti-blocking (L/L) | Water resistance (direct) | EtOH resistance (after recovery) | Detergent (direct) |
|---------|-----------|-----------|---------------------|---------------------------|----------------------------------|--------------------|
| Comp A  | 11        | Very good | Poor                | Poor                      | Poor                             | Moderate           |
| Comp B  | 0.4       | Very good | Poor                | Poor                      | Poor                             | Poor               |
| Comp C  | 79        | None      | Not measured        | Not measured              | Not measured                     | Not measured       |
| Ex1     | 2.4       | Very good | Very good           | Good                      | Excellent                        | Moderate           |
| Ex 2    | 2.4       | Very good | Good                | Good                      | Good                             | Very good          |

The coating compositions of Comparative example A and B result in coatings with low gloss values and soft feel coatings. However, the coating properties like anti-blocking and staining resistances (barrier properties) are inferior. The properties of comparative example A are significantly improved by the polymerisation of vinyl monomers inside the polyurethane particles, as shown in Examples 1 and 2. These hybrid particles, in which different polymers are intimately mixed, provide anti-blocking properties, as well as higher resistance levels.

Comparative example C shows that a "regular" small particle size polyurethane dispersion does not provide the desired low gloss and soft feel properties. Hence the barrier properties and stain resistance are not determined.

Example 3

Example 3 shows that the anti-blocking properties can be improved significantly by modifying comparative example B into a urethane/vinyl hybrid. Also the resistance profile is improved.

A 1000 cm3 flask equipped with a thermometer and overhead stirrer was charged with 275.0 g of the dispersion from comparative example B, 48.2 g of water and 33.5 g of MMA. After 60 minutes of mixing, the radical polymerization was initiated by the addition of 0.18 g of tertiary butyl hydroperoxide, 0.008 g of iron(II)EDTA and a subsequent addition of 9.30 g of a 1.82% solution of isoascorbic acid in demineralized water.

The resulting urethane/acrylic hybrid dispersion with a urethane/acrylic ratio of 70/30 had a solids content of 27.6 wt %, a pH of 9.1 and a viscosity of 20 cps. The dispersion has a D(0.5) mean particle size of 2.4 micron and a D(0.9) mean particle size of 7.5 micron.

Example 4

Example 4 shows that the anti-blocking properties and chemical resistances can be improved significantly by modifying comparative example B into a precrosslinked urethane/vinyl hybrid according to our invention.

A 1000 cm3 flask equipped with a thermometer and overhead stirrer was charged with 328.0 g of pTHF1000 (OH-value=112 mg KOH/g), 12.5 g DMPA and 0.18 g phosphoric acid 85%. A nitrogen atmosphere was applied. The mixture was homogenised at 40° C. for 10 minutes, before 178.2 g IPDI was added. This mixture was heated to 60° C. and kept at this temperature for 60 minutes. Subsequently reaction was carried out at 80° C. for 120 minutes. After the prepolymer is cooled to 75° C. and 31.2 g of Desmodur N3300 is added, the NCO-content of the mixture was 7.02%. Subsequently, 9.4 g of triethylamine was added to the prepolymer.

A 2000 cm3 dispersion vessel with a thermometer and overhead stirrer was charged with 953.6 g of demineralised water and 13.75 g Disponil AFX3070 (obtained from BASF) and 476.2 g of the neutralised prepolymer was dispersed in the aqueous phase while maintaining the temperature of the aqueous phase below 35° C. After the give amount of prepolymer was dispersed, stirring was continued for 5 minutes after which a mixture of 66.5 g of a 15.7% hydrazine solution was added to provide the chain extended polyurethane dispersion.

A 1000 cm3 flask equipped with a thermometer and overhead stirrer was charged with the polyurethane dispersion from this example, 24.0 g of water and 19.2 g of MMA. After 60 minutes of mixing, the radical polymerization was initiated by the addition of 0.20 g of tertiary butyl hydroperoxide, 0.007 g of iron(II)EDTA and a subsequent addition of 10.66 g of a 1.36% solution of isoascorbic acid in demineralized water.

The resulting urethane/acrylic hybrid dispersion with a urethane/acrylic ratio of 80/20 had a solids content of 31.9 wt %, a pH of 8.1 and a viscosity of 26 cps. The dispersion has a D(0.5) mean particle size of 2.3 micron and a D(0.9) mean particle size of 4.9 micron

TABLE 2

| | Gloss 60° | Soft feel | Anti-blocking L/L) | Water resistance (direct) | EtOH resistance (after recovery) | Coffee resistance | Detergent resistance |
|---|---|---|---|---|---|---|---|
| Comp B | 11 | Very good | Good | Poor | Poor | Poor | Poor |
| Ex 3 | 2.4 | Very good | Very good | Good | Poor | Good | Very good |

TABLE 2-continued

| | Gloss 60° | Soft feel | Anti-blocking L/L) | Water resistance (direct) | EtOH resistance (after recovery) | Coffee resistance | Detergent resistance |
|---|---|---|---|---|---|---|---|
| Ex 4 | 0.4 | Good | Very good | Good | moderate | Good | Very good |

Comparative Example D

Comparative example D is a polyurethane dispersion that is precrosslinked by the use of a triisocyanate. However, it is no urethane/vinyl hybrid dispersion.

A 2000 cm3 flask equipped with a thermometer and overhead stirrer was charged with 1072.2 g of pTHF1000 (OH-value=112 mg KOH/g), 32.2 g DMPA and 581.9 g IPDI. This mixture was heated to 50° C. and Zinc neodecanoate (0.31 g) was added. The reaction was allowed to exotherm to 95° C. After the exotherm was complete the reaction was kept at 95° C. for 2 hours. Subsequently, the prepolymer is cooled to 75° C. and 202.8 g of Desmodur N3300 is added. The isocyanate content of the prepolymer was 8.02% (theoretical 8.16%). 29.2 g of triethylamine was added to the prepolymer to neutralise the acid groups and the mixture was homogenised with stirring.

A 2000 cm3 dispersion vessel with a thermometer and overhead stirrer was charged with 972.7 g of demineralised water, 4.7 g of Tegofoamex 805 (obtained from Tego), 36.9 g of DSX 1514 (obtained from BASF) and 15.3 g Disponil AFX3070 (obtained from BASF). The mixture was homogenised with stirring and the temperature was adjusted to 20-22° C.

421.9 g of the neutralised prepolymer was dispersed in the aqueous phase adjusting the stir rate to improve dispersing of the prepolymer if necessary, while maintaining the temperature of the aqueous phase below 27° C. After the give amount of prepolymer was dispersed, stirring was continued for 5 minutes after which a mixture of 26.3 g DETA and 26.3 g of water was added to provide the chain extended polyurethane dispersion.

The resulting polyurethane dispersion had a solids content of 31.2 wt %, a pH of 8.4 and a viscosity of 1420 cps. The dispersion has a D(0.5) mean particle size of 1.8 micron and a D(0.9) mean particle size of 5.0 micron.

Example 5

Example 5 is the 90/10 urethane/vinyl modification of Comparative Example D. The hybrid is formed by the presence of methyl methacrylate during the dispersion process of the polyurethane. In this way, the vinyl monomers are migrating into the polyurethane particles and after chain extension reaction of the polyurethane, the monomers are polymerised inside the particles.

A 2000 cm3 flask equipped with a thermometer and overhead stirrer was charged with 1072.2 g of pTHF1000 (OH-value=112 mg KOH/g), 32.2 g DMPA and 581.9 g IPDI. This mixture was heated to 50° C. and Zinc neodecanoate (0.31 g) was added. The reaction was allowed to exotherm to 95° C. After the exotherm was complete the reaction was kept at 95° C. for 2 hours. Subsequently, the prepolymer is cooled to 75° C. and 202.8 g of Desmodur N3300 is added. The isocyanate content of the prepolymer was 7.94% (theoretical 8.16%). 29.2 g of triethylamine was added to the prepolymer to neutralise the acid groups and the mixture was homogenised with stirring.

A 2000 cm3 dispersion vessel with a thermometer and overhead stirrer was charged with 994.7 g of demineralised water, 4.7 g of Tegofoamex 805 (obtained from Tego), 36.9 g of DSX 1514 (obtained from BASF), 15.3 g Disponil AFX3070 (obtained from BASF) and 46.2 g of MMA. The mixture was homogenised with stirring and the temperature was adjusted to 20-22° C.

421.9 g of the neutralised prepolymer was dispersed in the aqueous phase adjusting the stir rate to improve dispersing of the prepolymer if necessary, while maintaining the temperature of the aqueous phase below 27° C. After the give amount of prepolymer was dispersed, stirring was continued for 5 minutes after which a mixture of 26.3 g DETA and 26.3 g of water was added to provide the chain extended polyurethane dispersion.

After 15 minutes of mixing, the radical polymerization was initiated by the addition of 0.32 g of tertiary butyl hydroperoxide, 0.0035 g of iron(II)EDTA and a subsequent addition of 21.4 g of a 1.0% solution of isoascorbic acid in demineralized water.

The resulting polyurethane dispersion had a solids content of 32.7 wt %, a pH of 8.0 and a viscosity of 1046 cps. The dispersion has a D(0.5) mean particle size of 2.2 micron and a D(0.9) mean particle size of 4.9 micron.

TABLE 3

| | Gloss 60° | Appearance of coating on a black substrate | Soft feel | Delta L value* | Anti-blocking (L/L) | Water resistance (direct) | EtOH resistance (after recovery) | Detergent (direct) |
|---|---|---|---|---|---|---|---|---|
| Comp D | 1.6 | Matt, whitish | Very good | 33 | Very good | Moderate | Poor | Moderate |
| 5 | 0.6 | Matt, black | Very good | 14 | Very good | Good | Moderate | Good |

*delta L = (L-value of the coating) − (L-value of the substrate = 6.2); coating is applied at 100 micron wet layer.

Comparative Example D is again an example of a polyurethane dispersion with low gloss values and soft feel coatings. A negative attribute for these dispersion is an opaque or whitish appearance. For some applications it is important that the coating is transparent and the film looks black when casted on a black substrate. This aspect is improved significantly by modifying the chemical composition of the polyurethane dispersion into a urethane/vinyl hybrid dispersion. Furthermore, the resistance profile is again improved when Example 5 is compared to Comparative Example D.

TABLE 4

| | Comp Ex A | Comp Ex B | Comp Ex C | Ex 1 | Ex 2 | Ex 3 | Ex 4 | Comp Ex D | Ex 5 |
|---|---|---|---|---|---|---|---|---|---|
| Polyurethane-vinyl polymer hybrid particles | No | No | Yes | Yes | Yes | Yes | Yes | No | Yes |
| Crosslinked polyurethane | Yes | No | No | Yes | Yes | No | Yes | Yes | Yes |
| PU component percentages (relative to total amount of components (a)-(g)) | | | | | | | | | |
| (a) | 19.9 | 32.1 | 32.6 | 19.9 | 19.9 | 32.1 | 31.7 | 29.0 | 29.0 |
| (b) | 1.7 | 2.2 | 4.9 | 1.7 | 1.7 | 2.2 | 2.2 | 1.6 | 1.6 |
| (c) | 65.9 | 59.1 | 61.0 | 65.9 | 65.9 | 59.1 | 58.3 | 53.4 | 53.4 |
| (d) | 2.0 | 6.5 | 1.5 | 2.0 | 2.0 | 6.5 | 2.2 | 6.0 | 6.0 |
| (e) | 0 | 0 | 0 | 0 | 0 | 0 | 0 | 0 | 0 |
| (f) | 10.5 | 0 | 0 | 10.5 | 10.5 | 0 | 5.5 | 10.1 | 10.1 |
| (g) | 0 | 0 | 0 | 0 | 0 | 0 | 0 | 0 | 0 |
| (d') | 0 | 0 | 0 | 0 | 0 | 0 | 0 | 6.0 | 6.0 |
| Sum of (f), (g) and (d') | 10.5 | 0 | 0 | 10.5 | 10.5 | 0 | 5.5 | 16.1 | 16.1 |
| U/A ratio | n/a | n/a | 4.0 | 3.8 | 9.1 | 2.6 | 3.9 | n/a | 9.5 |

The invention claimed is:

1. An aqueous coating composition comprising dispersed polymer particles, wherein
    (i) the dispersed polymer particles are polyurethane-vinyl polymer hybrid particles obtained by free-radical polymerization of at least one vinyl monomer in the presence of a polyurethane,
    (ii) the polyurethane and the vinyl polymer in the hybrid particles are present in a weight ratio of polyurethane to vinyl polymer ranging from 3:1 to 10:1,
    (iii) the polyurethane is obtained by the reaction of at least the following components:
        (a) from 10 to 35 wt. % of at least one organic difunctional isocyanate,
        (b) from 1 to 2.5 wt % of an isocyanate-reactive compound containing ionic or potentially ionic water-dispersing groups having a molecular weight of from 100 to 500 g/mol,
        (c) from 50 to 70 wt. % of at least one diol having a molecular weight from 500 to 5000,
        (d) from 0.5 to 10 wt. % of at least one active-hydrogen chain extending compound with a functionality of at least 2 other than water,
        (e) from 0 to 10 wt. % of at least one diol having a molecular weight below 500 g/mol, wherein
        the amounts of (a), (b), (c), (d) and (e) are given relative to the total amount of components used to prepare the polyurethane from which the building blocks from the polyurethane are emanated, and wherein
        the isocyanate (NCO) groups and hydroxy (OH) groups on the components used to prepare the polyurethane are present in a respective mole ratio of NCO groups to OH groups in a range of from 1.05:1 to 5:1,
    (iv) the dispersed polymer particles have a mean particle size (D[0.5]) greater than 1.2 micron,
    (v) the dispersed polymer particles have a mean particle size (D[0.9]) less than 6 micron, and
    (vi) the polyurethane of the polyurethane-vinyl polymer hybrid particles is crosslinked.

2. The aqueous coating composition according to claim 1, wherein the coating composition comprises
    (A) 75 to 99.7 wt. % of the dispersed polymer particles,
    (B) 0.2 to 15 wt. % of a rheology additive, and
    (C) 0.1 to 10 wt. % of a surfactant, wherein
    the amounts of (A), (B) and (C) are given relative to the total amount of (A), (B) and (C).

3. The aqueous coating composition according to claim 1, wherein at least 30 wt. % of the total amount of the at least one vinyl monomer used to prepare the vinyl polymer is selected from the group consisting of methyl methacrylate, butyl acrylate, butyl methacrylate, acrylonitrile, styrene and mixtures of two or more of said monomers.

4. The aqueous coating composition according to claim 1, wherein the diol (c) has a glass transition temperature Tg from −110° C. to +110° C.

5. The aqueous coating composition according to claim 1, wherein the crosslinked polyurethane is prepared by further adding at least one of the following crosslinker components (f), (g) and (d'):
    (f) from 1 to 20 wt. % of at least one organic polyisocyanate with an average functionality of >2.3;
    (g) from 1 to 10 wt. % of at least one polyol having a molecular weight of 500-5000 g/mol, an average functionality of at least 2.3, and a glass transition temperature Tg from −110° C. to +110° C.; and
    (d') at least one active-hydrogen chain extending compound with a functionality of 3 or higher in an amount of at least 50 wt. % of the component (d), wherein
    the amounts of the components (f), (g) and (d') are given relative to the total amount of components (a), (b), (c), (d), including d'), (e), (f) and (g), used to prepare the polyurethane.

6. The aqueous coating composition according to claim 5, wherein the total amount of the components (f), (g) and (d') are together more than 3 wt. %, relative to the total amount of components (a), (b), (c), (d), (d'), (e), (f) and (g) used to prepare the polyurethane, and wherein the total amount of the components (f), (g) and (d') are together at most 20 wt. %, relative to the total amount of the components (a), (b), (c), (d), (d'), (e), (f) and (g) used to prepare the polyurethane.

7. The aqueous coating composition according to claim 5, wherein the component (d') is a polyamine with a functionality of 3.

8. The aqueous composition according to claim 5, wherein the component (f) is selected from the group consisting of hexamethylene diisocyanate isocyanurate, hexamethylene diisocyanate biuret, isophorone diisocyanate isocyanurate and mixtures thereof.

9. The aqueous coating composition according to claim 1, wherein the dispersed polymer particles (A) have a mean particle size (D[0.5]) which is greater than 1.5 micron.

10. The aqueous coating composition according to claim 1, wherein the total amount of active-hydrogen chain extending compound employed, if used, apart from water, is such that the molar ratio of active hydrogens in the chain extender to isocyanate groups in the polyurethane prepolymer is in a range from 0.1:1 to 2:1.

11. The aqueous coating composition according to claim 1, wherein the aqueous coating composition is free of organic solvent.

* * * * *